(12) United States Patent
Chen et al.

(10) Patent No.: US 8,811,353 B2
(45) Date of Patent: Aug. 19, 2014

(54) RANK AND PMI IN DOWNLOAD CONTROL SIGNALING FOR UPLINK SINGLE-USER MIMO (UL SU-MIMO)

(75) Inventors: Runhua Chen, Dallas, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 776 days.

(21) Appl. No.: 12/424,439

(22) Filed: Apr. 15, 2009

(65) Prior Publication Data

US 2009/0262695 A1    Oct. 22, 2009

Related U.S. Application Data

(60) Provisional application No. 61/047,049, filed on Apr. 22, 2008.

(51) Int. Cl.
*H04W 4/00* (2009.01)
(52) U.S. Cl.
USPC ............................ 370/334; 370/329; 370/341
(58) Field of Classification Search
USPC .......................................... 370/334, 329, 341
See application file for complete search history.

(56) References Cited

U.S. PATENT DOCUMENTS

| | | | |
|---|---|---|---|
| 2008/0212701 A1* | 9/2008 | Pan et al. | 375/260 |
| 2009/0046805 A1* | 2/2009 | Kim et al. | 375/295 |
| 2009/0059844 A1* | 3/2009 | Ko et al. | 370/328 |
| 2009/0116570 A1* | 5/2009 | Bala et al. | 375/260 |
| 2009/0147880 A1* | 6/2009 | Wennstrom et al. | 375/267 |
| 2010/0322324 A1* | 12/2010 | Lindh et al. | 375/259 |
| 2011/0085507 A1* | 4/2011 | Jongren | 370/329 |

FOREIGN PATENT DOCUMENTS

| | | |
|---|---|---|
| EP | 1780925 | 5/2007 |
| KR | 1020060096360 | 9/2006 |
| WO | 2006130541 | 12/2006 |

* cited by examiner

*Primary Examiner* — Derrick Ferris
*Assistant Examiner* — Kodzovi Acolatse
(74) *Attorney, Agent, or Firm* — Ronald O. Neerings; Frederick J. Telecky, Jr.

(57) ABSTRACT

A method of operating a user equipment device includes extracting at least one rank indicator (RI) from an uplink grant, and adapting a transmission rank in response to said RI. At least two transmit antennas are configured to transmit according to said transmission rank.

18 Claims, 4 Drawing Sheets

RANK AND PMI IN DOWNLOAD CONTROL SIGNALING FOR UPLINK SINGLE-USER MIMO (UL SU-MIMO)

CROSS-REFERENCE TO RELATED APPLICATIONS

This application claims the benefit of U.S. Provisional Application Ser. No. 61/047,049, filed by Runhua Chen and Eko N. Onggosanusi, on Apr. 22, 2008, entitled "Rank and PMI in Download Control Signaling for Uplink Single-User MIMO (UL SU-MIMO)", commonly assigned with this application and incorporated herein by reference.

This application is filed concurrently with U.S. patent application Ser. No. 12/424,318, to Onggosanusi, Muharemoyic, Dabak and Chen, commonly assigned with this application and incorporated by reference in its entirety.

TECHNICAL FIELD

The present disclosure is directed, in general, to a wireless communication system and, more specifically, to a method of operating a user equipment device and method of operating a base station.

BACKGROUND

MIMO communication systems offer large increases in throughput due to their ability to support multiple parallel data streams that are each transmitted from different antennas. In single user MIMO (SU-MIMO), a user is served by one base station, and the user occupies a transmission resource, such as time or frequency, exclusively. SU-MIMO requires that the user has multiple transmit antennas and receive antennas. An objective of the protocol is to increase the data rate and communication reliability by exploiting the spatial multiplexing gain or spatial diversity gain available in MIMO channels.

In the most general form, MIMO transmissions employ a number of parallel spatial streams that are independently forward error correction (FEC) encoded. Each stream, also termed a codeword associated with a transport block, is then mapped to one or more spatial transmission layers. Mapping to multiple antennas can be done by introducing a linear transformation from the transmission layers to the physical antennas. The number of spatial transmission layers is called the rank of transmission, and the layers are mapped to the physical transmit antennas. This mapping is typically accomplished by linearly combining the layer signals to obtain the actual transmit signals. This operation is also termed pre-coding. A pre-coding matrix can be selected from a pre-determined set of matrices called a codebook. In such a case, the pre-coding operation is termed codebook-based pre-coding. It is also possible to perform non-codebook-based pre-coding. Overall, codebook-based signaling tends to require less signaling overhead.

Although current MIMO communications offer advantages over single antenna systems, further improvements would prove beneficial in the art.

SUMMARY

Embodiments of the present disclosure provide a method of operating a user equipment device, and a method of operating a base station. In one embodiment a user equipment device extracts at least one rank indicator (RI) from an uplink grant, and adapts a transmission rank in response to the RI. At least two transmit antennas are configured to transmit according to the transmission rank.

Another embodiment is a method of operating a base station having at least two transmit antennas. The base station receives a reference signal, and generates at least one rank indicator (RI) in response to receiving the signal. The base station transmits an uplink grant including the RI.

BRIEF DESCRIPTION

Reference is now made to the following descriptions taken in conjunction with the accompanying drawings, in which.

DETAILED DESCRIPTION

Figure 1A:
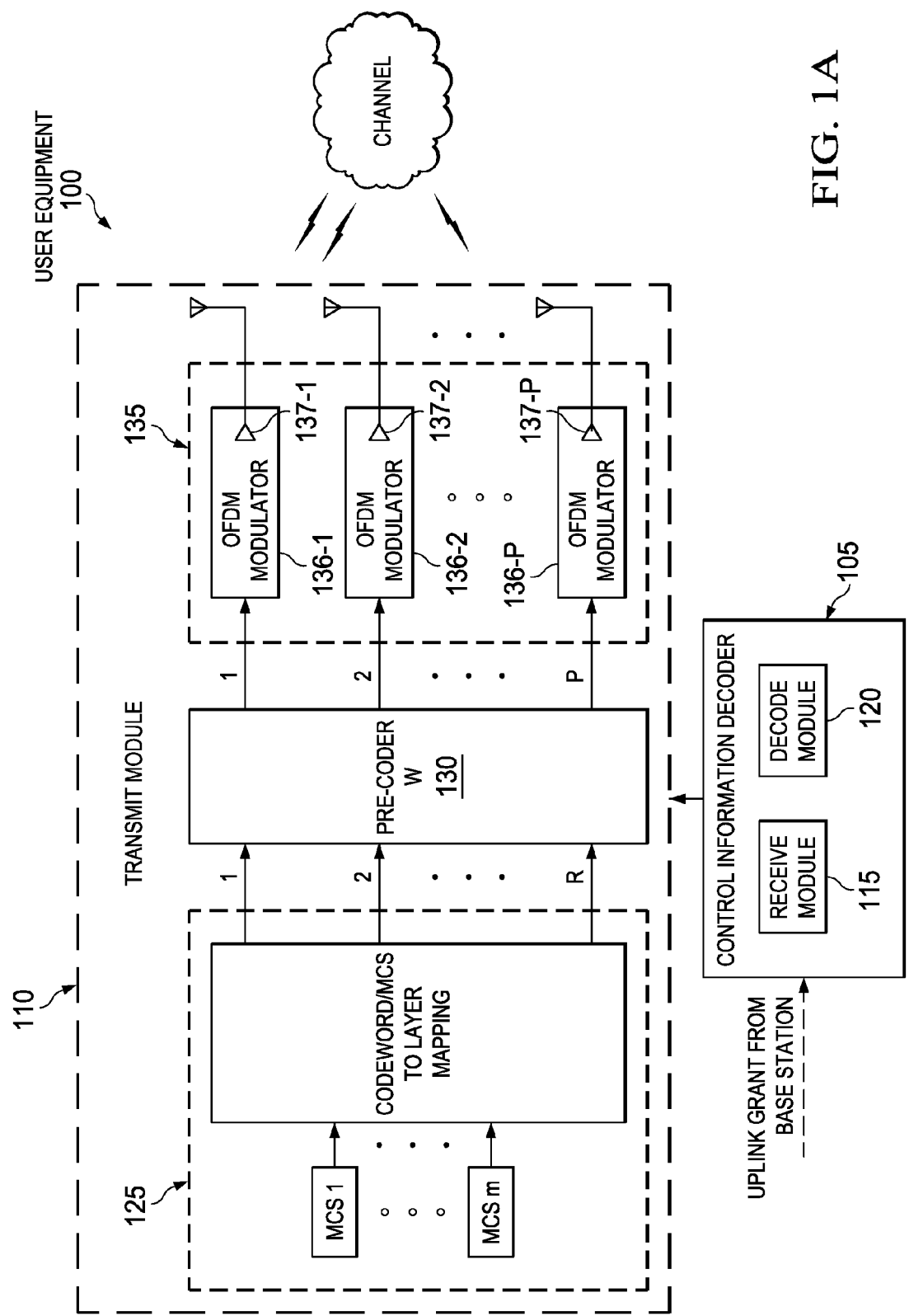
FIG. 1A illustrates a system diagram of a user equipment device.

Embodiments described herein and otherwise within the scope of the disclosure provide efficient means of conveying transmission parameters from a MIMO receiver, e.g., a base station, to a MIMO transmitter, e.g., UE. The transmitter may use these parameters to select a pre-coding matrix and adapt a transmission rank to communicate with the receiver.

Throughout this disclosure, the following acronyms have the accompanying corresponding meanings:

UE: user equipment, or user equipment device
eNodeB: enhanced base station node
DL: communication from the eNodeB to the UE
UL: communication from the UE to the eNodeB
RI: rank indicator
CQI: channel quality indicator
PMI: pre-coding matrix indicator
SRS: sounding reference signal
DMRS: demodulation reference signal
PDSCH: physical downlink shared (data) channel
PDCCH: physical downlink control channel
PUCCH: physical uplink control channel
PUSCH: physical uplink shared (data) channel
PHICH: physical hybrid ARQ indicator channel
ACK/NAK: acknowledged/negative acknowledged
OL-SM: open-loop spatial multiplexing
CL-SM: closed-loop spatial multiplexing
OFDM: orthogonal frequency-division multiplexing
OFDMA: orthogonal frequency-division multiple access The term "open-loop MIMO" (OL-MIMO), or OL-SM, refers to MIMO schemes for which pre-coding (e.g., selection of a pre-coding matrix) is not dependent on the MIMO channel. For example the pre-coding information is selected based on a fixed (non-channel-dependent) selection criterion. The transmit rank may or may not be adapted in a channel-dependent manner.

The term "closed-loop MIMO" (CL-MIMO), or CL-SM, refers to MIMO schemes for which pre-coding (e.g., selection of a pre-coding matrix) is adapted dependent on the MIMO channel. The transmit rank may or may not be adapted in a channel-dependent manner.

The transmission rank is defined as the number of spatial transmission layers (reflected in the number of columns in the pre-coding matrix). This applies in both downlink and uplink SU-MIMO.

The Evolved Universal Terrestrial Radio Access (E-UTRA) LTE specification, designated Rel. 8, supports up to four transmit antennas on downlink (DL), allowing DL data rates as high as about 326 Mbit/s per 20 MHz of spectrum bandwidth. However, only one UL transmit antenna is supported, so SU-MIMO is not supported on the UL. This limits the UL peak data rate to about 86 Mbit/s per 20 MHz of spectrum bandwidth. Thus, the signaling aspects of E-UTRA Rel. 8 are designed with this restriction in mind.

Embodiments herein address the asymmetry between UL and DL by presenting a UE device, a base station, a method of operating a UE device and a method of operating a base station. The UE device and the base station cooperate to provide multiple layers on the UL within the framework of current communications protocols between the UE and an eNodeB.

It is an objective of the various embodiments herein to provide for at least a doubling of the UL peak data rate from conventional communication protocol. It is further an objective to achieve this doubling while retaining backward compatibility with conventional protocols, such as, e.g., LTE Rel. 8, and support for two or four transmit antennas at the UE. While these objectives guide the various embodiments presented herein, such objectives are not to be construed as limitations on embodiments otherwise within the scope of the disclosure.

A conventional DL SU-MIMO system includes an eNodeB and one or more UE units. In conventional operation, the UE conveys one or more feedback signals to the eNodeB to support SU-MIMO on the DL. The feedback signals are often termed the UE reporting parameters. For example, the UE may provide feedback to the eNodeB in the form of a channel quality indicator (CQI), rank indicator (RI) and pre-coding matrix indicator (PMI) to indicate a quality attribute of a transmission resource (e.g., sub-band) allocated for communication from the eNodeB to the UE. The eNodeB may determine a transmission rank, a pre-coding matrix, and a modulation and coding scheme for each codeword (transport block) depending on the feedback. Feedback is conventionally considered to be such information conveyed by the UE to the eNodeB.

The eNodeB transmits DL data to the UE on a physical downlink data channel (PDSCH). In addition, the eNodeB transmits uplink control information via an uplink scheduling grant on a physical downlink control channel (PDCCH). An uplink scheduling grant, equivalently referred to hereinafter for brevity as an uplink grant, or simply a grant, is a collection of operating parameters instructing the UE how to communicate with the eNodeB in the uplink, thereby granting access to the eNodeB. A conventional uplink grant is relatively simple, since the conventional system does not support multi-rank transmission on the UL. Embodiments of an uplink grant that support UL SU-MIMO are presented below.

A physical hybrid ARQ indicator channel (PHICH) typically includes an ACK/NAK signal (transmitted in DL) to acknowledge receipt of UL data. The conventional UE transmits uplink data to the eNodeB on a physical uplink shared channel (PUSCH), and UE reporting parameters to support DL transmissions (e.g., CQI, PMI, and/or RI) via a physical uplink control channel (PUCCH). Note that such UE reporting parameters can also be transmitted via PUSCH. A sounding reference signal (SRS) and a demodulation reference signal (DMRS) are conventionally provided in the UL to be used by the eNodeB to measure the uplink channel, select appropriate layer mapping and perform UL data demodulation.

Additional aspects of CL-MIMO communications systems may be found in U.S. patent application Ser. No. 11/851,849, "Antenna Grouping And Group-Based Enhancements For MIMO Systems" to Varadarajan and Onggosanusi, incorporated herein by reference in its entirety; Ser. No. 11/688,756, "A Pre-Coder Selection Based On Resource Block Grouping" to Onggosanusi, Varadarajan and Dabak, incorporated herein by reference in its entirety; U.S. patent application Ser. No. 12/042,246, "User Equipment Feedback Structures for MIMO OFDMA" to Onggosanusi, Chen, Shen and Varadarajan, incorporated herein by reference in its entirety; and U.S. patent application Ser. No. 12/170,319, "Efficient Rank and Pre-coding Matrix Feedback for MIMO Systems" to Chen, Onggosanusi, Varadarajan and Dabak, incorporated herein by reference in its entirety.

Advantageously, the embodiments herein provide the desired increase of UL data rate, while providing backward compatibility with existing standards. Various embodiments described herein address the aforementioned objectives by including one or more of the following features:

Support for dynamic rank adaptation (in which rank or the number of transmission layers is adapted based on the short-term channel on the physical layer), pre-coding for closed-loop spatial multiplexing (CL-SM);

Possible support of open-loop spatial multiplexing (OL-SM);

Use of the PDCCH to provide an uplink grant including necessary information, e.g., a transmit PMI to support codebook-based pre-coding and/or a transmit RI, from the eNodeB to the UE.

Use of the uplink SRS to enable the eNodeB to estimate the channel quality for link adaptation, including pre-coder and rank adaptation;

Use of the DMRS to obtain channel estimation for PUSCH data demodulation;

Prohibiting the UE from overriding a channel assignment provided by the eNodeB;

Retaining the use of the PHICH to transmit the downlink ACK/NAK; and

Transmitting data from the UE to the eNodeB via the PUSCH.

FIG. 1A illustrates an embodiment of a UE device 100. referred to for brevity as the UE 100. A user equipment device is generally a device that includes a transmitter and a receiver, and is configured to communicate with a base station. User equipment includes but is not limited to a mobile station, a fixed or mobile subscriber unit, a pager, a cellular telephone, a personal digital assistant (PDA), a computer equipped with a network card, or any other type of user device capable of communicating with a base station. The UE 100 includes a control information decoder 105 and a transmit module 110.

Figure 1B:
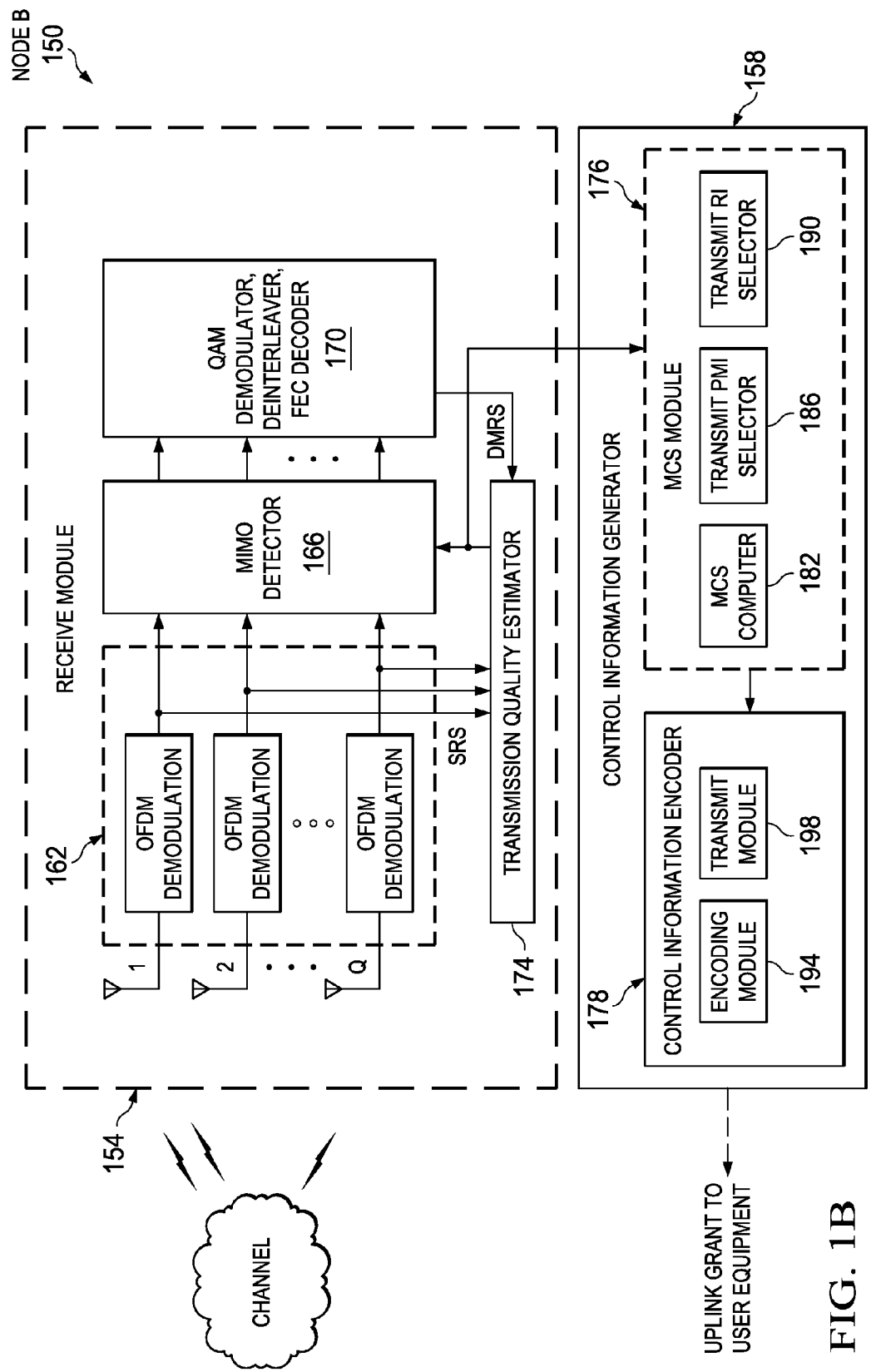
FIG. 1B illustrates a system diagram of a base station.

FIG. 1B illustrates a base station 150. The base station 150 may be an enhanced base station, synonymously referred to herein without limitation as the eNodeB 150. A base station is a network node that includes, e.g., a transmitter and a receiver configured to communicate with user equipment devices. The base station is typically associated with a network site that encompasses at least one cell, and is configured to provide network service to multiple user equipment devices within the site. The eNodeB 150 includes a receive module 154 and a control information generator 158. The receive module 154 employs transmission signals from the UE 100, which includes multiple transmit antennas, and is configurable to transmit an uplink scheduling grant to the UE 100 that includes at least one of transmit RI and transmit PMI. The terms "transmit RI" and "transmit PMI" convey the distinction between the RI and PMI provided in the uplink scheduling grant from the RI and the PMI exchanged between a UE and a base station in conventional DL SU-MIMO. Hereinafter, where the terms RI and PMI appear without qualification, they are understood to be a transmit RI and a transmit PMI, respectively. The UE 100 is capable of adapting a transmission rank in response to the RI.

In FIG. 1A, the transmit module 110 includes a modulation and coding scheme (MCS) module 125, a pre-coder 130 and a modulator section 135. The transmit module 110 is employed to transmit data provided by the MCS module 125 to the eNodeB 150 based on pre-coding provided by the pre-coder 130. The MCS module 125 receives an RI extracted by the decoder 105 from an uplink grant from the eNodeB 150. The module 125 maps m codewords, where m≥1, to R spatial layers or transmit streams. R is the transmission rank, which is at least one. Each codeword consists of FEC-encoded, interleaved, and modulated information bits. The module 125 may be configured, e.g., for multi-rank transmission, such as rank 2 or rank 4. The signal associated with each codeword (MCS 1, ..., MCS m) may take different formats. For UL transmission which utilizes OFDMA, each codeword may be composed of a series of PSK (such as QPSK) or QAM (such as 16QAM and 64QAM) data symbols. In LTE, the UL transmission is based on DFT-spread OFDMA or single-carrier FDMA as a special case. In such cases, an additional spreading/pre-coding with a DFT (Discrete Fourier Transform) matrix is performed for each codeword after the PSK/QAM modulation operation. The DFT spreading is typically performed across all the assigned modulated symbols per codeword.

The MCS module 125 maps the m codewords to R layers and provides R spatial streams to the pre-coder 130. The pre-coder 130 receives a PMI extracted by the decoder 105 from the uplink grant, and processes data, e.g., the R spatial streams, with a pre-coder matrix associated with the PMI. The pre-coder 130 provides input to each of P modulators 136-1, 136-2, ..., 136-P in the modulator section 135 with a desired P×R pre-coding matrix W, where P is the number of UE transmit antennas, and P≥R. The modulators 136 are illustrated without limitation as OFDM modulators. In some embodiments, the modulators 136 are OFDMA modulators. Each modulator 136-1, 136-2, ..., 136-P includes an associated power amplifier 137-1, 137-2, ..., 137-P. Each power amplifier 137 amplifies an output of the associated modulator 136 for transmission by an associated antenna. The UE 100 includes at least two transmit antennas. The UE 100 also transmits one or more reference signals, e.g., an uplink SRS or a DMRS, that the eNodeB 150 may use to estimate the uplink channel quality.

The receive module 154 of the eNodeB 150 (FIG. 1B) receives the transmission from the UE 100. The receive module 154 includes a demodulator module 162 having, e.g., Q OFDM demodulators coupled to corresponding receive antenna(s). For an OFDM-based UL system, as is the illustrated embodiment, the demodulator provides Q demodulated data streams to a MIMO detector 166, which provides data streams to a decoding module 170 that performs PSK/QAM demodulation, de-interleaving, and FEC decoding. For UL systems with DFT-spread OFDMA, an inverse DFT spreading is generally performed prior to the PSK/QAM demodulation.

The control information generator 158 includes an MCS module 176 and a control information encoder 178. The MCS module 176 includes an MCS computer 182, a transmit PMI selector 186, and a transmit RI selector 190. The MCS module 176 may be implemented in software, hardware, or a combination thereof.

A transmission quality estimator 174 determines a quality of the RF link from the UE 100 to the eNodeB 150 and of one or more data channels output by the demodulator module 162. The estimator 174 may employ one or more reference signals transmitted by a transmitter, e.g., the UE 100, to make the estimation. In the illustrated embodiment, e.g., the estimator 174 receives Q SRS signals from the module 162 and a DMRS signal from the module 170. The SRS, discussed further below, enables the eNodeB 150 to estimate the channel quality for rank/PMI adaptation. In the illustrated embodiment, the module 176 receives a channel/interference estimate from the estimator 174 from the module 170. In other embodiments, the module 176 may receive the SRS and the DMRS directly.

In various embodiments, the SRS enables eNodeB to measure the UL-MIMO channel and is configured to provide information on the types of adaptation modes which are analogous to different CQI reporting modes in DL-MIMO. For example, the SRS may enable the eNodeB 150 to measure the UL-MIMO channel to derive the rank, pre-coding, and modulation and coding scheme for UL-MIMO transmission. In preferred embodiments, the SRS is not pre-coded. In some embodiments, the DMRS provides channel estimation for data (PUSCH) demodulation. Hence, DMRS can be pre-coded, with the number of DMRS layers following the RI. The module 176 provides to the encoder 178 a transmit PMI via the selector 186, a transmit RI via the selector 190.

An encoding module 194 assembles an uplink grant that includes the transmit RI and transmit PMI. The transmit RI and the transmit PMI represent an uplink transmission configuration of the UE 100. A transmit module 198 transmits the uplink grant to the UE 100.

The decoder 105 (FIG. 1A) includes a receive module 115 and a decode module 120. The receive module 115 accepts the uplink grant from the eNodeB 150. The decode module 120 decodes the uplink grant and provides the contents thereof, including, e.g., a RI and a PMI, to the transmit module 110. The decode module 110 may also derive the pre-coding matrix from the transmit PMI and provide the matrix to the transmit module 110 The pre-coder matrix may be retrieved, e.g., using the PMI to index a memory within the decoder 105. In some embodiments, the retrieval is performed within the pre-coder 130 using the PMI. The transmit module 110 may then initiate an SU-MIMO data transmission consistent with the uplink grant.

Note that the preceding description corresponds to CL-SM where the PMI or RI is adaptively configured based on the channel, assigned by the eNodeB 150 and used to select a pre-coder at the UE 100. The illustrated embodiments of the UE 100 and the eNodeB 150 may also support OL-SM, in which the PMI is assigned according to a fixed criterion and is not channel-dependent. In both operational modes the SRS and DMRS may still be transmitted by the UE 100 to the eNodeB 150, and the eNodeB 150 may return an uplink grant including an RI.

Figure 2:
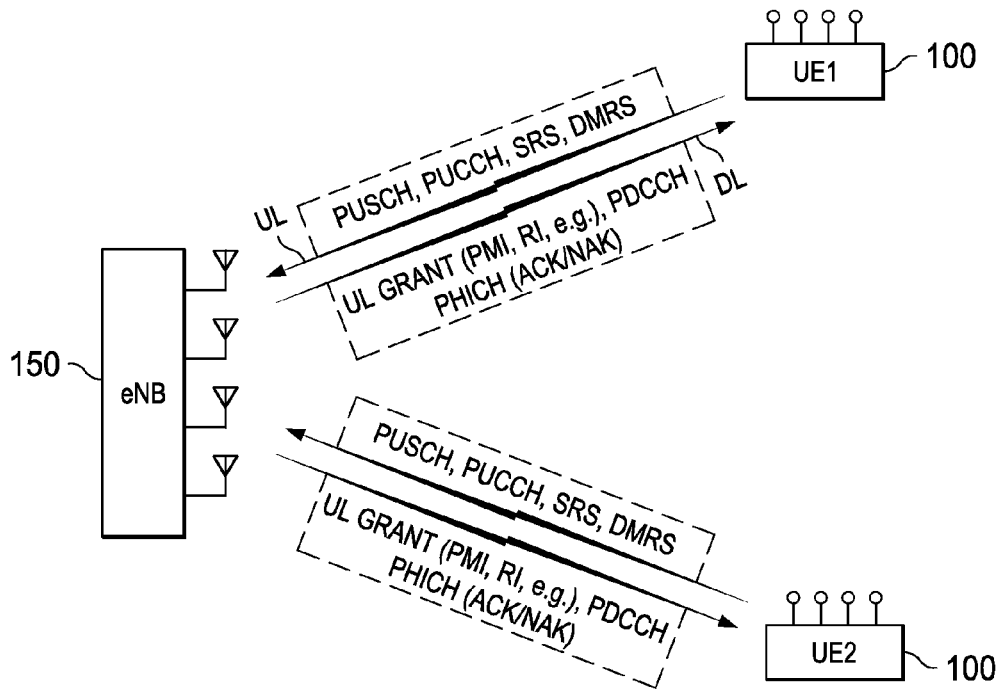
FIG. 2 illustrates signaling between a user equipment device and a base station.

The cooperative signaling between the eNodeB 150 and two UE 100 is schematically illustrated in FIG. 2. This embodiment is illustrated without limitation as including four transmit and four receive antennas (e.g., 4×4 UL SU-MIMO). Signaling between the eNodeB 150 and each UE 100 includes a DL and a UL. The DL includes a PDCCH and a PHICH. The PDCCH conveys the uplink grant. The PHICH conveys the DL ACK/NAK in response to UL data, as is the case for a conventional system. The UL includes, e.g., an SRS and a DMRS, a PUSCH and a PUCCH. As mentioned previously the eNodeB 150 may use the SRS to estimate the channel quality.

For DL SU-MIMO transmission, the UE 100 may feed back the recommended DL transmission format (e.g., PMI/CQI/RI) in the form of UL control feedback to the eNodeB 150. The eNodeB 150 retains control over the communications protocol by having the ability to override the UL control feedback. In other words, the eNodeB 150 does not necessarily follow the recommendation/feedback provided by the UE 100, and may choose a different transmission format.

In contrast to DL-MIMO, in UL-MIMO operation uplink the control parameters are determined by the eNodeB 150. The eNodeB 150 selects the parameters to be used on the UL channel using, e.g., the SRS. The selected control parameters may then be transmitted to UE 100 in the uplink grant via PDCCH. The uplink grant may then be used for UL-MIMO transmission from the UE 100 to the eNodeB 150. In various embodiments, the parameters selected by the eNodeB 150 are not overridden by the UE 100. In other words, in such embodiments, the UE 100 always follows the transmission format (e.g. PMI/RI) selected by the eNodeB 150.

In another embodiment, the signaling between the UE 100 and the eNodeB 150 employs an additional uplink physical control parameter that carries more detailed channel quality information. This control entity may be viewed as being analogous to the CQI employed in DL closed-loop operation, and is referred to herein as a UL CQI. The UL CQI may be particularly beneficial in embodiments in which non-codebook based pre-coding is used. However, use of the UL CQI may result in additional downlink control overhead that may be undesirable in some circumstances.

As discussed previously, the uplink grant is a set of parameters sent by the eNodeB 150 to the UE 100 that instruct the UE 100 to use certain transmission and data format protocols. Table I includes various parameters of the uplink grant for the conventional case of single-antenna uplink transmission as in E-UTRA Rel. 8, e.g., Format 0, and those of two embodiments of the disclosure. Field bit lengths are tabulated for each parameter. In a first embodiment, the uplink grant is a CLSM 1CW/2CW−1 where a single DL ACK/NAK is transmitted for one/two codewords. The second embodiment is a UL-CLSM 2CW−2 where two DL ACK/NAK bits are transmitted for two UL-MIMO codewords. The embodiments of Table I assume the following:

1) the DL CLSM codebooks in E-UTRA Rel. 8 are reused along with dynamic rank adaptation; and
2) To avoid excessive reduction in the available number of DMRS resources per cell, only up to 2 DMRS cyclic shifts are assigned even for 4-layer transmission. Furthermore, assigning up to 4 DMRS cyclic shifts for 4×4 MIMO further increases the DCI payload to six bits, which is undesirable. To support 4-layer transmission, it is possible to employ orthogonal covering across the two DMRS symbols within each sub-frame.

TABLE I

| Field | Format 0 (SIMO) | | UL-CLSM 1CW/2CW−1 | | UL-CLSM 2CW−2 | |
| --- | --- | --- | --- | --- | --- | --- |
| | 5 MHz | 20 MHz | 5 MHz | 20 MHz | 5 MHz | 20 MHz |
| Format Flag | 1 | 1 | 1 | 1 | 1 | 1 |
| Hopping Flag | 1 | 1 | 1 | 1 | 1 | 1 |
| RB Assignment | 9 | 13 | 9 | 13 | 9 | 13 |
| MCS-RV | 5 | 5 | 5 | 5 | 5 | 5 |
| New Data Indicator (NDI) | 1 | 1 | 1 | 1 | 1 | 1 |
| TPC | 2 | 2 | 2 | 2 | 2 | 2 |
| Cyclic Shift for DMRS | 3 | 3 | 6 | 6 | 6 | 6 |
| CQI Request | 1 | 1 | 1 | 1 | 1 | 1 |
| UL Index (TDD only) | 2 | 2 | 2 | 2 | 2 | 2 |
| RNTI/CRC | 16 | 16 | 16 | 16 | 16 | 16 |
| PMI (2 or 4-Tx) | — | — | 2 or 4 | 2 or 4 | 2 or 4 | 2 or 4 |
| RI (2 or 4-Tx) | — | — | 1 or 2 | 1 or 2 | 1 or 2 | 1 or 2 |
| MCS-RV for $2^{nd}$ CW | — | — | — | — | 5 | 5 |
| New Data Indicator for $2^{nd}$ CW | — | — | — | — | 1 | 1 |
| Total | 39 | 43 | 45 or 48 | 49 or 52 | 51 or 54 | 55 or 58 |

Figure 3:
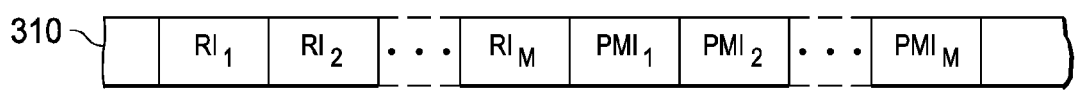
FIG. 3 illustrates portions of uplink grants.
Figure 3:
Figure 3:
Figure 3:
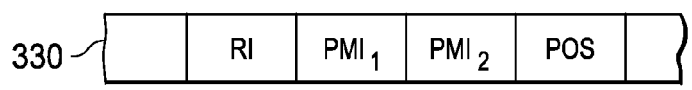
Figure 3:
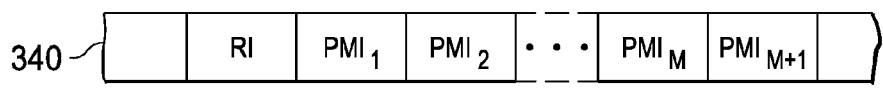

FIG. 3 illustrates embodiments of uplink grants 310, 320, 330, 340, constructed according to the present disclosure and transmitted to a MIMO transmitter, e.g., the UE 100. Each uplink grant 310, 320, 330, 340 includes at least one RI and at least one PMI. Each additionally includes other parameters that are not shown, such as those tabulated in Table I. The uplink grant 310 represents a general case, in which the grant includes a plurality of RI fields $RI_1$, $RI_2$, . . . $RI_i$, and a plurality of PMI fields $PMI_1$, $PMI_2$, . . . $PMI_j$. Depending on various factors, indexes i and j may each range from one to several.

In general MIMO communication, rank adaptation can be frequency-selective, such that different sections of bandwidth allocated to the same MIMO transmitter can support a different rank. However, such a configuration may incur significant complexity in the transmitter, such as additional hardware and software resources. In some cases, this complexity may be deemed too costly for any added performance benefit. For example, when the MIMO transmitter is a cellular communication device such as a cellular telephone or PDA, power and space requirements may impose significant limitations on system complexity. Other types of mobile MIMO transmitters may not be so limited, however. Where it is desirable to limit system complexity, it may be preferable to configure wideband rank adaptation where a single transmission rank (RI) is employed over the uplink transmission bandwidth allocated to a UE 100.

With wideband adaptation, the uplink grant 320 includes only one RI, i.e., i=1. Thus, only a single RI is transmitted to the UE 100 via the uplink grant, to reduce complexity of the UE 100. Without limitation, the uplink grants 330, 340 also use only one RI. However, uplink grants with multiple rank indicators are within the scope of the disclosure.

The number of bits for RI signaling in the uplink grant depends on whether RI is to be signaled jointly or separately with the PMI field. In the case of separate RI and PMI signaling, RI signaling overhead depends on the number of possible rank values for UL-MIMO transmission. For instance, assuming the set of possible uplink rank values are $\{R_1, R_2, \ldots R_N\}$, the number of bits for RI signaling in the uplink grant is thus given by $\log_2(N)$. Herein N may be the maximum UL-MIMO transmission rank $N=(\min(N_{tx}, N_{rx}))$ where $N_{tx}$ and $N_{rx}$ are the number of transmit and receive antennas, respectively. Alternatively, if codebook subset restriction is configured where UL-MIMO transmission rank is confined to a particular set, the number of bits for RI indication may be less than $\log_2(\min(N_{tx}, N_{rx}))$.

The number of PMI fields in the uplink grant depends generally on the pre-coding strategy employed. For OL-SM embodiments, where pre-coding is configured according to a pre-determined fixed criterion, PMI does not need to be signaled to the MIMO transmitter (e.g., the UE 100) from the MIMO receiver (e.g., the eNodeB 150). Hence the uplink grant may not contain a PMI field. On the other hand, for CL-SM embodiments, where pre-coding is channel-dependent and dynamically configured by the MIMO receiver, a PMI field is typically present in the UL grant.

Pre-coding may be broadly categorized as wideband pre-coding or frequency-selective pre-coding. In wideband pre-coding, a single PMI is applied to a plurality of sub-bands configured for the UE 100 uplink transmission. Thus, the number of PMI fields in the uplink grant may be a few as one, i.e., j=1, when the PMI applies to all of the sub-bands assigned by the uplink grant. Assuming a pre-coding codebook of size $L_k$ for rank-$R_k$ pre-coding, where $L_k$ is optionally an integer power of 2, the PMI field in the uplink grant may occupy as few as $\lceil \log_2(L) \rceil$ bits, where $L = \max_{k=1, 2, \ldots N}(L_k)$, e.g., when the PMI is binary coded. ($\lceil x \rceil$ denotes the minimum integer number greater than or equal to x.) Of course, the PMI may be encoded using other means, e.g., binary coded decimal, at the expense of greater uplink grant overhead. In some wideband pre-coding embodiments, as exemplified by the uplink grant 320, only one PMI field is included in the uplink grant.

In another embodiment, it is possible to signal the RI and PMI jointly in the uplink grant as opposed to signaling them independently. For instance, assume the set of possible rank values are $\{R_1, R_2, \ldots R_N\}$, and the size of the rank-$R_k$ codebook is $L_k$. Consequently for wideband pre-coding, the combined RI/PMI field in the uplink grant may occupy $\log_2(L)$ bits where $$L = \sum_{k=1}^{N} L_k.$$

In some embodiments, RI is jointly encoded with other uplink grant parameters, e.g., MCS, NDI or RV.

In a nonlimiting example, a rank 1 codebook has 15 entries, and a rank 2 codebook has a single entry. An uplink grant including separately encoded RI and PMI may have an RI field width of 1 bit, and a PMI field width of 4 bits. Uplink grant 325 includes an RI/PMI field in which the RI and PMI are jointly encoded. Because the possible combinations of rank and PMI are fully described by 16 states, the RI/PMI field may be 4 bits. In this case, the UL grant overhead is reduced by one bit relative to the case of separately encoded RI and PMI. Note that the overhead for joint RI/PMI signaling is equivalent to the case of separate RI/PMI signaling, if the codebook sizes for different ranks are identical, i.e., $$\log_2(L) = \log_2\left(\sum_{k=1}^{N} L_k\right) = \log_2(N) + \log_2(L_1),$$

$$\text{if } L_1 = L_2 = \ldots = L_N.$$

Some uplink grants configure the UE 100 for frequency-selective pre-coding. Frequency-selective pre-coding provides the ability to assign a different codeword to various sub-bands. In this technique, multiple PMI values may be provided in the uplink grant.

The uplink grant 330 exemplifies some embodiments including multiple PMI fields. In particular, the uplink grant 330 may be used for selected sub-band pre-coding. In selected sub-band pre-coding, a number, greater than one, of pre-coding matrixes are employed by a MIMO transmitter, e.g., the UE 100. Each pre-coding matrix is associated with a distinct PMI. A first PMI may be associated with a set of min(M,P) sub-bands. P is a number of sub-bands allocated to the UE 100 by the uplink grant. M is a number of sub-bands in a subset of the allocated sub-bands that may meet certain optimality criteria, e.g., minimum signal-to-interference plus noise ratio (SINR). Thus, the PMI associated with the M sub-bands is sometimes referred to as a "best-M" PMI. M is an integer value, equal to or greater than one, that may be configured by higher layer signaling.

In cases for which M<P, a second PMI, $PMI_2$, may be associated with a selected subset of the min(M,P) sub-bands, e.g., the subset consisting of the P–M sub-bands that are not included in the set of sub-bands meeting the optimality criteria. In some embodiments, $PMI_2$ is a wideband PMI selected over all the P assigned sub-bands. In other embodiments, $PMI_2$ is associated with a pre-coding matrix that is selected for the remaining max(P–M,0) sub-bands.

In some cases, the number of optimum sub-bands equals or exceeds the number of allocated sub-bands, i.e., M≥P. In such cases, $PMI_1$ may describe the PMI associated with all the P allocated sub-bands, in which case $PMI_2$ is superfluous. However, the relevant signaling standards do not provide for dynamic varying of the uplink grant format. Thus, in some embodiments, the $PMI_2$ field is retained even if M≥P. In such cases, $PMI_2$ may simply be ignored by the MIMO transmitter.

In some embodiments $PMI_2$ is encoded differentially with respect to $PMI_1$. Recalling that $PMI_2$ is a wideband PMI, the corresponding codebook includes L pre-coding matrixes. $PMI_1$, i.e., the best-M PMI, represents a subset of the pre-coding matrixes of the codebook. The subset, denoted as $\Omega(PMI_2)$, contains $L_1$ pre-coding matrices, where $L_1 < L$. $PMI_1$ is mapped to $\Omega(PMI_2)$ and the index of the codeword to which $PMI_1$ is mapped may be binary encoded using a field width of $\log_2(L_1)$ bits. Thus, e.g., when $\Omega(PMI_2)$ includes one half or fewer pre-coding matrices than does the entire codebook, $PMI_1$ may be binary coded with fewer bits than needed to code $PMI_2$.

In some embodiments, exemplified by the uplink grant 330, a position indicator POS included in the uplink grant indicates the position of the best-M sub-bands within the P assigned sub-bands. For example, the UE 100 may be assigned 8 sub-bands, denoted $SB_0$, $SB_1$, ... $SB_7$, of which sub-bands $SB_3$ and $SB_4$ are determined to meet the optimality criteria. In this example, POS may be binary encoded with the value "100" to indicate that the subset of optimum sub-bands begins with $SB_3$, e.g., the fourth sub-band in the P allocated sub-bands. Alternatively, POS could be encoded with the value "11" to indicate that the sub-band of index value 3 is the first sub-band of the subset $\Omega$. Of course encoding types other than binary may be used. In general it is expected that the subset $\Omega$ will be a number of contiguous sub-bands in the larger set of allocated sub-bands. However, the use of the position indicator field is not limited to such cases.

In M-sub-band pre-coding, the number of assigned sub-bands may vary across uplink subframes. Current signaling standards do not allow varying the size of the uplink grant across different subframes. Thus, signaling a PMI for each sub-band is not practicable.

The uplink grant 340 is applicable to embodiments using sub-band pre-coding. Fields containing $PMI_1$, $PMI_2$, ... $PMI_M$ are provided, with each PMI corresponding to one of the M allocated sub-bands. A remainder PMI, $PMI_R$ provides a PMI for any remaining sub-bands. In some embodiments, $PMI_R$ may be, e.g., a wideband PMI applicable to the P allocated sub-bands. In other embodiments, $PMI_R$ may be a wideband PMI applicable to the remaining sub-bands if the number P of allocated sub-bands is greater than M. Because each sub-band includes only a portion of the allocated sub-bands, $PMI_1$, $PMI_2$, ... $PMI_M$ may be encoded differentially with respect to $PMI_R$ and encoded with fewer bits than $PMI_R$ in many cases.

Figure 4:
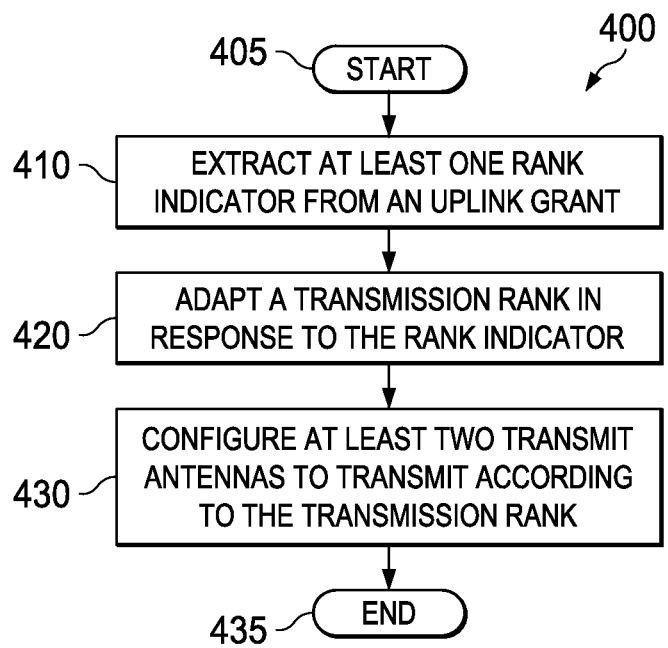
FIGS. 4 and 5 illustrate methods.

FIG. 4 illustrates a method 400 of operating a user equipment device, in accordance with the embodiments herein. The method 400 is described without limitation with reference to the UE 100. The method 400 begins with a step 405. In a step 410, the UE 100 extracts at least one RI from an uplink grant. The extraction may be done, e.g., by the decoder 105. In a step 420, the UE 100 adapts a transmission rank in response to the RI. In a step 430, the device configures at least two transmit antennas to transmit according to the extracted transmission rank. In some embodiments, the UE 100 extracts at least one PMI from the uplink grant. The PMI may be a single, wideband PMI. The PMI may be jointly encoded with the RI in some embodiments. In some embodiments, the UE 100 extracts at least two PMIs, wherein a first PMI is associated with a set of P sub-bands allocated by the grant, and a second PMI is associated with at least one sub-band of the set of P allocated sub-bands. The second PMI may optionally be encoded differentially with respect to the first PMI using fewer bits than the first PMI. The second PMI may be associated with a selected subset of the set of P allocated sub-bands In some embodiments, the uplink grant includes a position indicator representing a position of the selected subset within the set of P allocated sub-bands The method 400 ends with a step 435.

Figure 5:
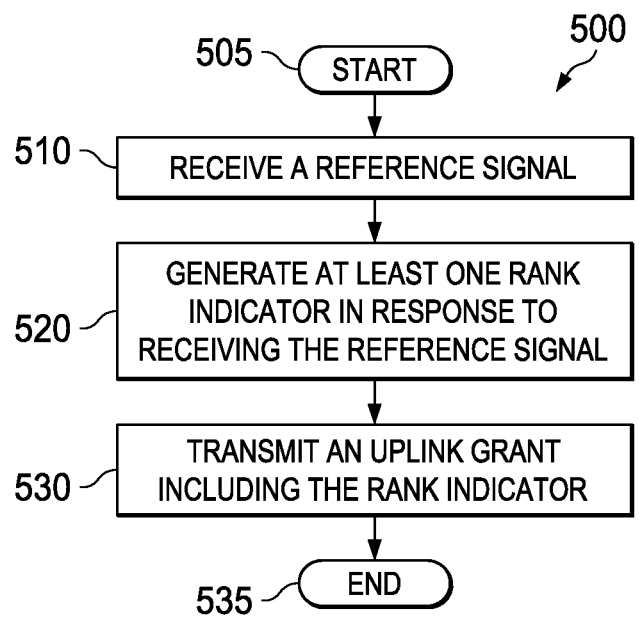

FIG. 5 illustrates a method 500 of operating a base station having at least two receive antennas. The method 500 is described without limitation with reference to the eNodeB 150. The method begins with a step 505. In a step 510, the base station receives a reference signal. The reference signal may be, e.g., an SRS or a DMRS transmitted by a UE 100 such as a cellular telephone. In a step 520, the base station generates at least one RI in response to receiving the reference signal. The uplink grant may be generated, e.g., by the control information generator 158. In a step 530, the base station transmits an uplink grant that includes the at least one RI. In some embodiments, the base station jointly encodes the RI with a PMI. The PMI may be, in some embodiments, a single, wideband PMI. Optionally, the uplink grant may include two PMIs, with a first PMI being associated with a set of P sub-bands allocated by the uplink grant, and a second PMI being associated with at least one sub-band of the set of P allocated sub-bands. In some cases, the second PMI may be associated with a selected subset of the set of P allocated sub-bands. The uplink grant may, in some embodiments, include a position indicator representing a position of the selected subset within the set of P allocated sub-bands. In some embodiments, the second PMI is encoded differentially with respect to the first PMI, using fewer bits than the first PMI. The method 500 ends with a step 535.

Those skilled in the art to which this application relates will appreciate that other and further additions, deletions, substitutions and modifications may be made to the described embodiments.

What is claimed is:

1. A method of operating a user equipment device, comprising:
   extracting at least one indication of rank from an uplink grant;
   adapting a transmission rank in response to said indication of rank;
   configuring at least two transmit antennas to transmit according to said transmission rank; and
   extracting at least two pre-coding matrix indicators (PMI) from said uplink grant, wherein a first PMI is associated with a set of P sub-bands allocated by said grant, and a second PMI is associated with at least one sub-band of said set of P allocated sub-bands.

2. The method of claim 1, further comprising extracting at least one pre-coding matrix indicator (PMI) from said uplink grant.

3. The method of claim 2, wherein said indication of rank is jointly coded with said PMI.

4. The method of claim 2, wherein said at least one PMI is a single wideband PMI.

5. The method of claim 1, wherein said second PMI is associated with a selected subset of said set of P allocated sub-bands.

6. The method of claim 5, wherein said selected subset has a higher signal-to-interference plus noise ratio than a remaining subset of said sub-bands.

7. The method of claim 5, wherein said uplink grant includes a position indicator representing a position of said selected subset within said set of P allocated sub-bands.

8. The method of claim 1, wherein said second PMI is encoded differentially with respect to said first PMI.

9. The method of claim 8, wherein said second PMI is encoded using fewer bits than said first PMI.

10. A method of operating a base station having at least two receive antennas, comprising:
    receiving a reference signal;
    generating at least one indication of rank in response to said receiving;
    transmitting an uplink grant including said indication of rank; and
    generating at least two pre-coding matrix indicators (PMI) and including said PMIs in said uplink grant, wherein a first PMI is associated with a set of P sub-bands allocated by said grant, and a second PMI is associated with at least one sub-band of said set of P allocated sub-bands.

11. The method of claim 10, further comprising generating at least one pre-coding matrix indicator (PMI) and including said PMI in said uplink grant.

12. The method of claim 11, further comprising jointly encoding said indication of rank and PMI.

13. The method of claim 11, wherein said at least one PMI is a single wideband PMI.

14. The method of claim 10, wherein said second PMI is associated with a selected subset of said set of P allocated sub-bands.

15. The method of claim 14, wherein said selected subset has a higher signal- to-interference plus noise ratio than a remaining subset of said sub-bands.

16. The method of claim 14, wherein said uplink grant includes a position indicator representing a position of said selected subset within said set of P allocated sub-bands.

17. The method of claim 10, wherein said second PMI is encoded differentially with respect to said first PMI.

18. The method of claim 17, wherein said second PMI is encoded using fewer bits than said first PMI.

* * * * *